United States Patent [19]

Shatila et al.

[11] 4,272,556
[45] Jun. 9, 1981

[54] METHOD FOR FORMING POTATO DOUGH FROM DRY POTATO AGGLOMERATES AND WATER

[75] Inventors: Mounir A. Shatila; William H. Von Der Lieth, both of Blackfoot, Id.

[73] Assignee: AMPCO Foods, Inc., San Francisco, Calif.

[21] Appl. No.: 718,849

[22] Filed: Aug. 30, 1976

Related U.S. Application Data

[63] Continuation of Ser. No. 507,601, Sep. 19, 1974, abandoned.

[51] Int. Cl.³ ............... D21C 3/04; D21C 11/18; D21D 2/00
[52] U.S. Cl. ........................ 426/453; 426/637; 426/455; 426/506; 426/516
[58] Field of Search ............ 426/506, 512, 496, 455, 426/515, 516, 549, 637, 453; 425/161, 168

[56] References Cited

U.S. PATENT DOCUMENTS

| | | | |
|---|---|---|---|
| 3,021,220 | 2/1962 | Going et al. | 426/549 |
| 3,348,950 | 10/1967 | Weiss | 426/549 |
| 3,399,062 | 8/1968 | Willard, Jr. et al. | 426/506 |
| 3,565,636 | 2/1971 | Hutchings et al. | 426/512 |
| 3,605,647 | 9/1971 | Beck et al. | 425/168 |
| 3,622,355 | 11/1971 | Beck et al. | 426/637 |
| 3,634,105 | 1/1972 | Beck | 426/506 |
| 3,771,937 | 11/1973 | Harmon et al. | 425/161 |

FOREIGN PATENT DOCUMENTS

966050  8/1964  United Kingdom ................ 426/506

Primary Examiner—S. Leon Bashore
Assistant Examiner—Steve Alvo
Attorney, Agent, or Firm—Thomas H. Olson

[57] ABSTRACT

A horizontal cylinder having a circular discharge opening at one end and a piston moveable toward and away therefrom. The cylinder has an upwardly open side inlet opening through which dry potato agglomerates and water is introduced. An impervious barrier spanning the discharge opening prohibits egress of water through the discharge opening, and after the dry product and water are introduced through the inlet opening into the chamber, the piston is moved toward the impervious wall to consolidate the dry product and water into a confined volume so as to distribute the water uniformly throughout the dry product and produce a homogeneous potato dough that can be formed into shaped potato pieces, such as french fry shaped pieces. A method for enhancing uniform wetting of the dry product, which includes the steps of introducing into the chamber a minor amount of the water, then introducing the dry product, and then introducing the balance of the water. The method also optimizes formation of the dough by controlling the movement of the piston during consolidation so as to further optimize uniform wetting of the dry potato product.

8 Claims, 6 Drawing Figures

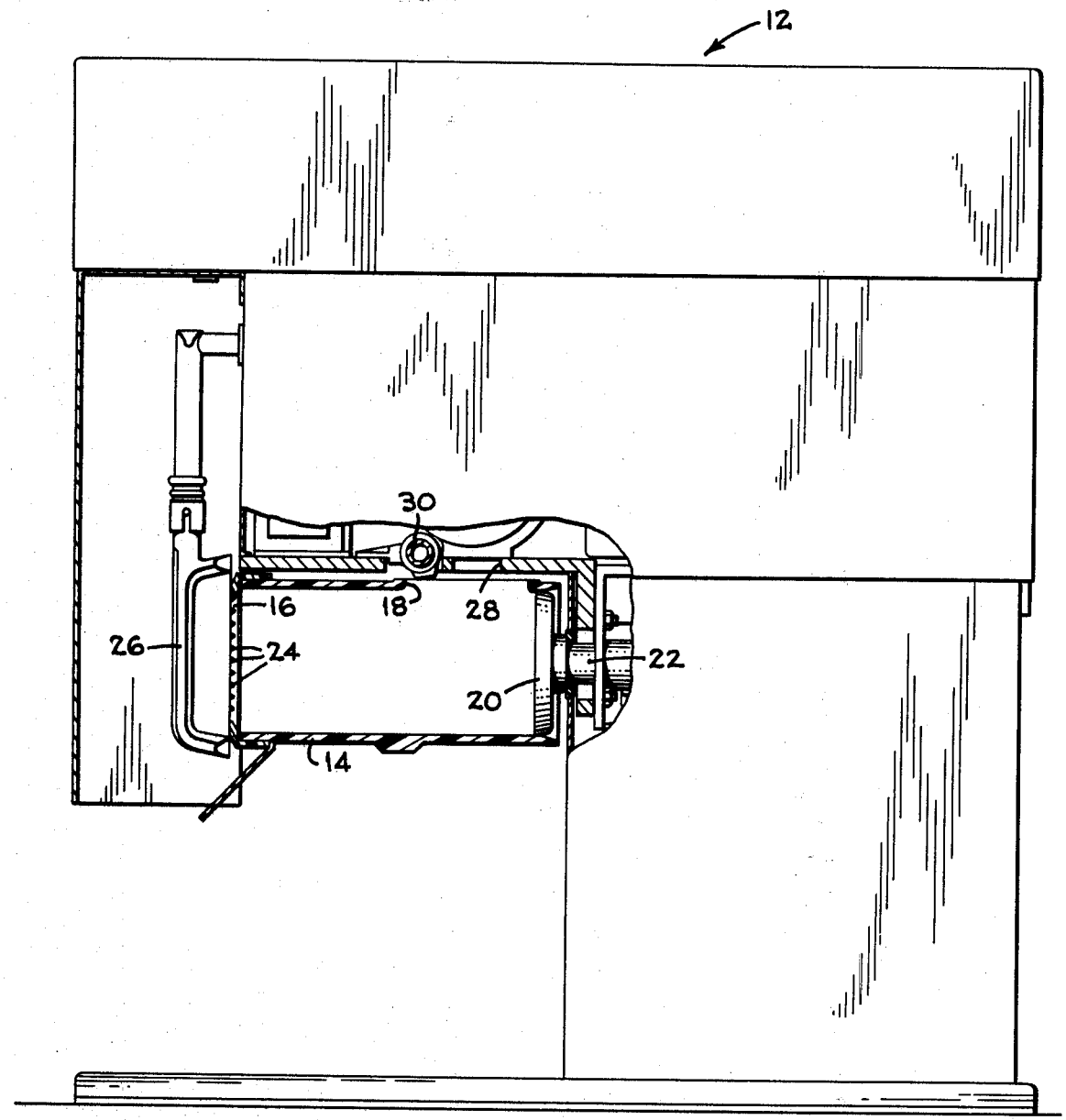

METHOD FOR FORMING POTATO DOUGH FROM DRY POTATO AGGLOMERATES AND WATER

This is a continuation of Application Ser. No. 507,601 filed Sept. 19, 1974, now abandoned.

BACKGROUND OF THE INVENTION

1. Field of the Invention

This invention relates to a method for reconstituting dry potato agglomerates into a dough by addition of water thereto so that the water is uniformly distributed thereby to provide a homogenous dough.

2. Description of the Prior Art

Commonly owned U.S. Pat. Nos. 3,771,937 and 3,605,647 disclose apparatus and methods for forming french fry shaped potato pieces by reconstituting dry potato agglomerates of the type described in U.S. Pat. No. 3,622,355 by adding water thereto to form a potato dough and by separating the dough into the appropriately shaped pieces. Such patents disclose methods for combining the water and the dry potato agglomerates which have been most satisfactory in producing a potato dough product.

SUMMARY OF THE INVENTION

The present invention provides an improved method for effecting reconstitution of the potato agglomerates by addition of water thereto, which improves still further the uniformity of the dough formed by the apparatus and method described in the above-noted U.S. Patents.

The principal object of the present invention is to effect formation of potato dough without substantial agitation or stirring and which dough manifests uniformity and homogeneity throughout the body of the dough.

In fully appreciating the accomplishment of the foregoing object, it should be understood that the method typically employs a chamber having an outlet or discharge opening and a piston that is driven toward and away from the outlet opening. The chamber has a side inlet opening through which the water and dry potato agglomerates are introduced when the piston is retracted away from the discharge opening.

According to one aspect of the present invention, the above-noted object is achieved by introducing into the chamber a small quantity of water amounting to, say, 15%-20% of the total volume of water employed. Thereafter the dry potato agglomerates are introduced into the chamber, following which the balance of the water necessary for reconstitution is added. The initial introduction of the small quantity of water provides dough of a superior consistency and uniformity in that potato fines, some of which consist of particles containing only one potato cell, are wetted more thoroughly when they are introduced into the chamber having a small quantity of water as compared with a dry chamber.

Another aspect of the method of the present invention can be appreciated when it is considered that the agglomerates are so constituted that a period of time, in the order of one minute, is required after addition of the water for a potato dough to be formed. Thus, the piston is retracted, the water and dry potato agglomerates are added, and then, before the materials set up into a firm potato dough, the piston is moved about half way toward the discharge opening to consolidate the water and agglomerates into a volume suitable for formation of the dough. According to the present invention, the forward stroke of the piston in its movement toward the consolidating position is interrupted at a point about midway in the piston stroke. During the quiescent period of the piston movement, the water has an opportunity to migrate or disperse in a more or less uniform way throughout the intersticies between individual particles of the dry agglomerate; after termination of interruption, the piston stroke is completed. The piston is then retained in the consolidating position for the period of time required for the water and dry agglomerates to set up into a firm potato dough.

The foregoing, together with other objects, features and advantages of the present invention, will be more apparent after referring to the following specification and the accompanying drawing.

BRIEF DESCRIPTION OF THE DRAWING

FIG. 1 is a simplified view of a french fry forming apparatus in which the method of the invention is particularly suitable.

DESCRIPTION OF THE PREFERRED EMBODIMENT

Figure 2A:
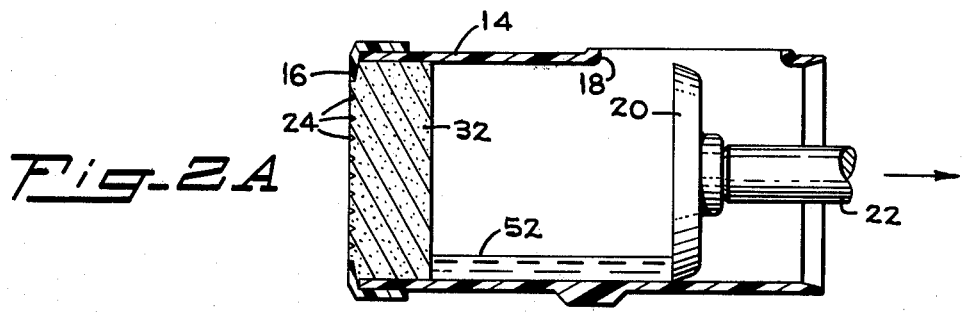
FIGS. 2(A), 2(B), 2(C) and 2(D) are diagrammatic views of the piston in various positions throughout its cycle of operation in practicing the method of the invention.

Referring more particularly to the drawing, reference numeral 12 indicates a machine for forming french fry shaped pieces, a detailed description of the various parts of the machine being contained in the aforecited U.S. Pat. No. 3,771,937. Such apparatus includes a cylindrical chamber 14 having at one end thereof a discharge opening 16 and at the side thereof an inlet opening 18. As can be seen in FIG. 1, inlet opening 18 is confined to the rear or righthand portion of chamber 14. A piston 20 is disposed in sealing relation to the wall defining chamber 14 and is reciprocated toward and away from discharge opening 16 by a rod 22. The mechanism for controllably driving rod 22 is explained in detail in the above-noted U.S. Patents and will not be repeated here, it being sufficient for present purposes to understand that the movement of rod 22 and piston 20 are timed to effect formation of the dough and to discharge the dough from discharge opening 16.

Supported adjacent opening 16 is a dough-separating mechanism consisting of a series of parallel, spaced apart, thin members 24 and a transverse cutter 26, which severs from the dough mass within chamber 14 that portion of the dough that projects through opening 16 and between the thin, elongated rigid members 24 so that french fry bodies are formed.

Apparatus 12 also includes a dry product storage bin and metering device which delivers to an outlet chute 28 at the proper time a preselected amount of dry potato agglomerates. The dry potato agglomerates can be as described in U.S. Pat. No. 3,622,355. A nozzle 30 is provided adjacent chute 28 for supplying a preselected amount of water of a preselected temperature at the proper time. It will be noted that chute 28 and nozzle 30 are located in vertical alignment above inlet opening 18 of chamber 14.

Before describing the details of the present method, a brief review of the operation of the apparatus in forming potato dough from water and dry potato agglomerates and in shaping the dough so formed into french fry shaped pieces will be set forth. When a body of dough has been formed, piston 20 resides in a position as shown in FIG. 2(D), there being a light or like visual indicator for apprising the operator that the machine is ready for operation. When a quantity of french fry shaped pieces is desired, the operator presses a start button, or the like, and piston 20 moves toward discharge opening 16 to discharge the dough therethrough. Elongate members 24 and transverse cutter 26 cooperate to form the dough into french fry shaped pieces as it egresses from discharge opening 16. Forward movement of piston 20 is terminated leaving a body of dough adjacent the discharge opening to form an impervious barrier 32 as shown in FIG. 2A behind which water and potato agglomerates are introduced in forming the next dough charge. Alternatively, a seal plate as described in U.S. Pat. No. 3,771,937 can be employed to form impervious barrier 32.

Figure 2B:
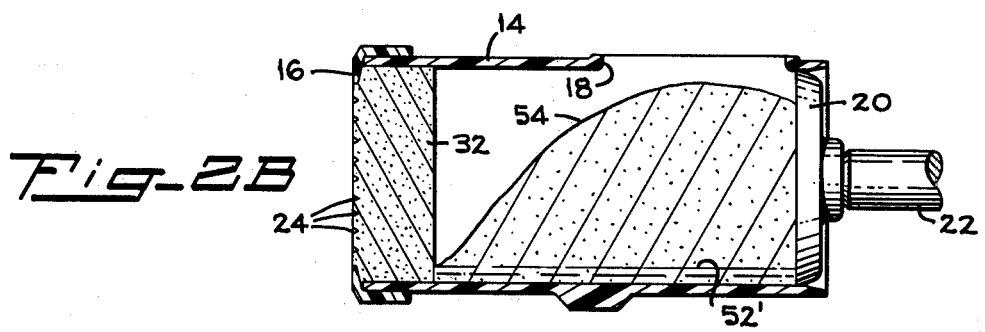

When dispensing is completed, rod 22 is retracted so as to move piston 20 to the rearward most position, shown in FIG. 2(B). With the piston in the rearward most position, water and dry product are introduced into chamber 14 through inlet opening 18, and piston 20 is moved to a "rehydrate" position of FIG. 2(D).

When piston 20 is in the "rehydrate" position, the volume in chamber 14 between the piston and barrier 32 is approximately equal to the bulk volume of the dry potato agglomerate introduced into the chamber from chute 28. The bulk volume includes the volume of the dry product plus the volume of the interstices intermediate individual particles, which interstices are water filled prior to commencement of absorbtion of water into the particles. Time delay circuitry within apparatus 12 inhibits further operation of the machine for a period to enable formation of the dough, such period typically being in the range of about 30–90 seconds depending on the water temperature. Thereafter a visual indication of readiness is provided so that the operator of the machine can dispense another quantity of french fry shaped pieces.

From the foregoing summary of operation it can be seen that the uniformity of the french fry shaped pieces depends on the uniformity or homogeneity of the dough which in turn depends on the uniformity with which the water from nozzle 30 is distributed throughout the agglomerate. A factor which may tend to inhibit formation of a uniform homogeneous dough is that the agglomerated particles, when manufactured and shipped, have a diameter of about 1/16th–⅛th inch but during shipment and handling the particles abrade against one another to cause the existence of fines that have sizes as small as one potato cell. In order to form a uniform homogeneous dough, it is essential that both the fines and the agglomerated particles can be exposed to sufficient moisture. Because the fines have a tendency to gravitate toward the bottom of the bin that feeds chute 28, they are typically introduced into chamber 14 at the outset of the period of dry product introduction. According to the present invention, the total amount of water necessary to rehydrate the dry product is introduced in two portions at two different periods of time. More specifically, a minor amount of water, sometimes referred to hereinafter as "pre-water," is introduced into chamber 14, before introduction of dry product. Then the dry product is introduced, and finally, the balance of the water. When the fines, which typically enter at the beginning of the dry product introduction period, contact the minor amount of water that has been introduced into the chamber, the fines are more efficiently wetted so that a more uniform homogeneous dough is produced. The pre-water or first quantity of water can be approximately ¼ of the second quantity of water constituted by the above mentioned balance of the water.

Figure 3:
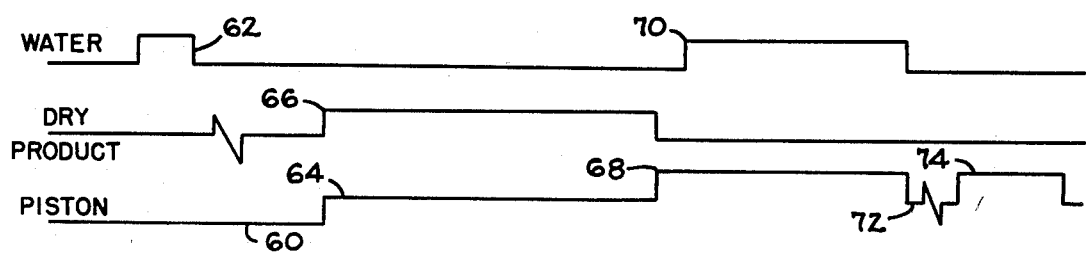
FIG. 3 is a plot against time of the sequence of introduction of water and dry product into the chamber, as well as the position and direction of movement of the piston within the chamber.

In one system employing the method of the present invention, 450 ml of water is required to rehydrate the dry product. The sequence of the addition of water and dry product in such exemplary system is indicated in FIG. 3. It will there be seen that a minor quantity of about 75 ml of water is introduced into chamber 22 after which the total amount of the dry potato agglomerate is added, and finally, the balance or majority of the water (375 ml in the example under discussion) is added. This sequence of addition of the two constituents into chamber 14, together with controlled movement of piston 20, assures a uniformly homogeneous product even in the presence of fines.

The movement of the piston 20 is synchronized with the sequence of addition of the constituents in order to enhance further the uniformity of the dough. With reference to FIG. 2(A), the pre-water is introduced as the piston is moved rearward and away from discharge opening 16. The timing mechanism of the apparatus is arranged such that the pre-water is introduced after the piston moves rearward by an amount sufficient that the surface of the piston is rearward of a position in vertical alignment below nozzle 30. When the pre-water is first introduced, it assumes a level indicated at 52 in FIG. 2(A). After the piston reaches its rearward or rightward most position, shown in FIG. 2(B), the pre-water has been lowered to a level indicated at 52' in the latter figure. The dry product is then introduced into the chamber through chute 28 and initially assumes a profile indicated at 54. The fines are not shown in the drawings but they typically reside in the bottom of the chamber where they are wetted by the pre-water. Then the timing mechanism moves piston 20 forward, or leftward as viewed in the figures. During forward piston movement the balance of the water is introduced and the piston is moved to the position shown in FIG. 2(D) at which the dry product and water are consolidated into a volume corresponding to the bulk volume of the dry product which appproximates the volume the dough will occupy after it has been formed. It has been found that the dough has excellent uniformity because the introduction of a minor quantity of water before commencement of introduction of the dry product assures that any fines will be thoroughly and uniformly wetted.

Figure 2C:
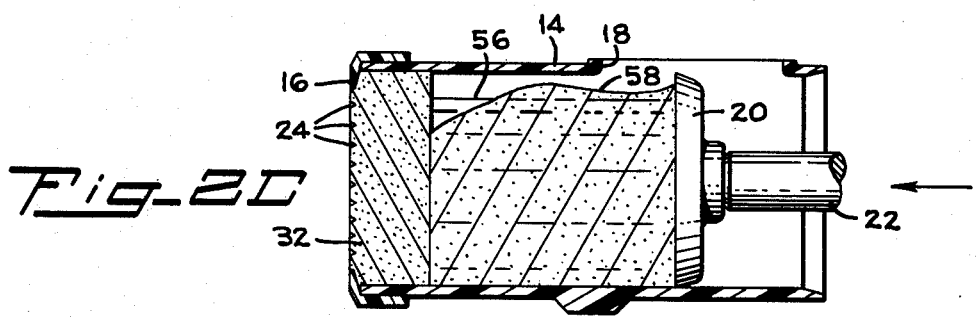
Figure 2D:
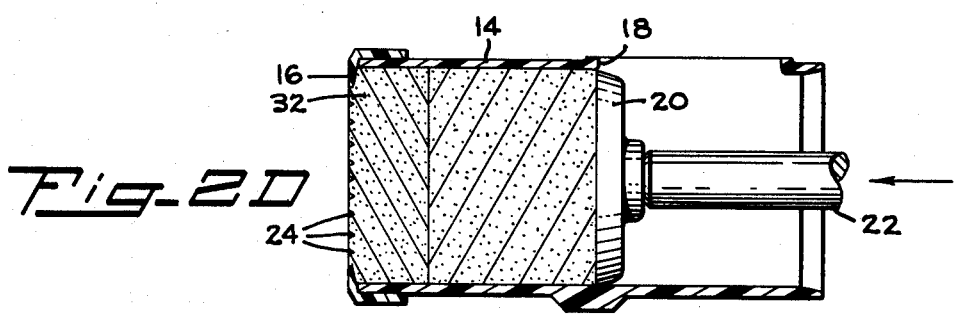

In practicing the method of the present invention, the dry product delivered into chamber 14 from chute 28 is preferably of the type described in U.S. Pat. No. 3,622,355. The dry product disclosed in the '355 patent has a prescribed water absorbtion rate. Uniformity of the dough is enhanced by uniform dispersal of water throughout the interstices or voids between adjacent agglomerated particles so that when absorbtion occurs each cell absorbs substantially the same quantity of water. For confining the dry product and water into a volume optimally configured to achieve uniform water distribution before absorbtion, the present invention includes the step of causing piston 20 to pause in a quiescent state at a position intermediate the rearward most position shown in FIG. 2(B) and the consolidate position shown in FIG. 2(D). The intermediate or pause position of piston 20 is shown in FIG. 2(C). In employing the dry product disclosed in the '355 patent and apparatus of the type described in the '937 patent, the duration of the pause step has been established at about 4½ seconds. Forward or leftward movement of piston 20 toward the pause or quiescent position typically occurs simultaneously with introduction of the main quantity of water into chamber 14. In the quiescent position, the physical dimensions of the volume within chamber 14 between piston 20 and impervious barrier 32, together with the quantities of dry product and water and the water absorbtion rate of the dry product are such that water is uniformly distributed or dispersed throughout the agglomerated particles thereby to assure uniform wetting of the particles. After maintaining piston 20 in the quiescent state for a time sufficient to effect thorough wetting of the particles but insufficient to permit the mixture to set into a firm dough, the pause step is terminated and piston 20 is moved to the consolidate position shown in FIG. 2(D), the volume of the chamber between piston 20 and impervious barrier 32 in the consolidate position being such that it is substantially totally occupied by the mixture and the dough that is produced by the mixture.

In amplification of the pause step, the location at which the step of pausing forward movement of the piston 20 is performed is such that the level of the water at 56 in FIG. 2(C) and the level of the dry product at 58 substantially coincide. Coincidence is achieved in one system designed to perform the method at a position at which the distance between piston 20 and impervious barrier 32 is approximately equal to the cylindrical diameter of chamber 14. The duration of the pause step is sufficiently long to permit thorough wetting of the agglomerated particles but insufficient to permit rehydration to proceed so far as to form a stiff dough.

The operation of the method of the present invention will now be recapitulated having reference to FIGS. 2(A)–2(D) and FIG. 3. After the dispensing of dough through discharge opening 16 has been completed, piston 20 is moved in a rearward direction depicted in FIG. 2(A). The timing of rearward movement of the piston is depicted in FIG. 3 at 60. When the piston reaches a position behind nozzle 30, the water supply system is activated, typically for about 0.5 second, to introduce into chamber 14 the pre-water. The timing of this action is indicated at 62 in FIG. 3. When piston 20 reaches the rearward most position within chamber 14 (see FIG. 2(B)), the piston is stopped as at 64 in FIG. 3 and dry product introduction is commenced as at 66. In practicing the method of the present invention in the apparatus as disclosed in the '937 patent, approximately three seconds are required for introducing the dry product into the chamber. Because, as explained above, there may well be fines introduced into the chamber, and because the fines typically gravitate to the bottom of the chamber and are introduced at the outset of the three second period, the fines typically fall to the bottom of chamber 14 and are moistened by the pre-water therewithin.

Next the piston is moved forward in a consolidating stroke as indicated at 68 in FIG. 3 and the main water charge is introduced from nozzle 30 into chamber 14 as indicated at 70. Forward movement of the piston continues until the piston reaches the pause or quiescent state shown in FIG. 2(C), such state being indicated at 72 in FIG. 3. At about the same time that the consolidating stroke is temporarily interrupted for the pause, the inflow of water is terminated. After the pause, 4κ seconds in the example referred to above, the consolidate stroke is completed, as indicated at 74 in FIG. 3, so that the piston resides in the consolidate position shown in FIG. 2(D). The consolidate position is maintained for a period suitable for the materials to set into a firm dough, after which the operator is apprised by a visual signal that the dough is ready for discharge through opening 16 and shaping into shaped potato pieces.

The step of sequential or two-stage introduction of water into chamber 14 and the step of interrupting piston movement during the consolidating stroke effect improvement individually; when both steps are combined in the dough forming process, a synergistic result occurs and a highly uniform homogeneous dough is formed. Uniformity of the dough mass within chamber 14 assures uniformity of the shaped pieces as well as smooth operation of piston 20 as it moves forward from the consolidate stroke during discharge of the dough.

Thus it will be seen that the present invention provides an improved method for forming potato dough from water and dry potato agglomerates, which method improves the uniformity of water distribution throughout the dry product and consequently improves the homogeneity of the product.

Although one embodiment of the invention has been shown and described, it will be obvious that other adaptations and modifications can be made without departing from the true spirit and scope of the invention.

What is claimed is:

1. In an improved process for forming potato dough by combining a quantity of water sufficient to form dough with a quantity of dry potato agglomerates containing fines in a chamber and consolidating the water and agglomerates into a volume within said chamber by reciprocating a piston therewithin in a consolidating stroke thereby forming a homogeneous dough without agitation, the improvement comprising the steps of:
 (a) introducing a first minority portion of said water into the chamber, the minority portion being in the range of about 15%–20% by volume of the quantity of water;
 (b) adding all the agglomerates containing fines into the first portion of water in the chamber to form a mix; and then
 (c) supplying the balance of said quantity of water into the mix and moving said piston in a consolidating stroke thereby wetting said fines more efficiently so that a more uniform homogeneous dough is produced, the supplying and moving steps being performed before the agglomerates and water set into a firm dough.

2. In a method for forming dough by introducing dry potato agglomerates having fines and a preselected amount of water sufficient to reconstitute the agglomerates to form dough into a chamber and consolidating the same into a volume within the chamber by reciprocating a piston therewithin in a consolidating stroke, the method which comprises the steps of first introducing about 15%–20% by volume of the preselected amount of water in the chamber so as to provide sufficient water in the chamber to wet the fines, then introducing the totality of the dry potato agglomerates including the fines into said chamber, then introducing the balance of the water, and finally moving the piston in the consolidating stroke before the wetted agglomerates set into a firm dough, said piston moving step including the steps of moving the piston by a first amount constituting a part of the consolidating stroke, interrupting the moving step to effect a pause with the piston in a quiescent state for a duration less than the set time of the dough and long enough to permit the water to disperse throughout the potato agglomerates, and then resuming movement of the piston to complete the consolidating stroke.

3. A method according to claim 2 wherein said piston moving step and said second water introducing step are performed in part simultaneously.

4. A method according to claim 2 in combination with the step of moving the piston in a direction opposite the consolidating stroke during performance of said first water introducing step.

5. A method for operating a potato dough forming machine of the type including a substantially horizontally elongated cylindrical chamber having a discharge end opening, a rear end opposite the discharge opening and an upward open inlet opening remote from the discharge opening and adjacent the rear end, a piston slidable in the chamber toward and away from the discharge opening, and an impervious barrier spanning the discharge opening, said method comprising the steps of rearwardly moving the piston away from the barrier to a position rearward of the inlet opening, introducing into the chamber through the inlet opening a first quanitity of water intermediate the piston and the barrier, introducing into the chamber through the inlet opening a quantity of dry potato agglomerated particles containing fines, forwardly moving the piston toward the barrier, introducing into the chamber through the inlet opening between the piston and the barrier a second quantity of water sufficient with the first quantity of water to rehydrate the potato particles and form them into a firm dough, the first quantity of water being sufficient to wet the fines and the second quantity of water being substantially greater than the first quantity of water, last said water introducing step being performed at least in part simultaneously with said forwardly moving step, temporarily interrupting said forwardly moving step to permit the piston to reside temporarily in a quiescent state in which the volume in the chamber between the impervious barrier and the piston is more than the bulk volume of the potato particles, resuming forward piston movement so as to terminate the quiescent state before the water and potato particles set into a firm dough and after the water disperses throughout the potato particles, and terminating forward movement of the piston when the volume in the chamber between the piston and the barrier is approximately equal to the bulk volume of the potato particles so that the potato particles are rehydrated into a firm dough.

6. A method according to claim 5 wherein the duration of the quiescent state is about 4½ seconds.

7. A method according to claim 5 wherein the first quantity of water introduced is approximately ¼th of the second quantity of water introduced.

8. A method for consolidating water and dry potato agglomerate into a given volume to effect formation of firm dough comprising the steps of providing a chamber that is elongated on a generally horizontal axis, the chamber having a discharge opening and a piston slidable therein along the axis toward and away from the discharge opening, providing an impervious barrier in sealing relation of the discharge opening, retracting the piston away from the impervious barrier, introducing the water and dry potato agglomerate into the chamber ahead of the piston, moving the piston toward the impervious barrier, interrupting the moving step for a period less than the set time of the dough and sufficiently long for the water to disperse throughout the potato agglomerates, and then completing movement of the piston to a consolidate position before the wetted agglomerates set to a firm dough, the consolidate position being such that the given volume is defined in the chamber between the piston and the impervious barrier, said introducing step including the steps of injecting a minor portion of water into the chamber, the minor portion being sufficient to wet fines in the dry potato agglomerate and insufficient to rehydrate the agglomerates, then delivering the totality of the dry product including fines into the chamber, and then supplying the remainder of the water into the chamber.

* * * * *